(12) United States Patent
Zhang et al.

(10) Patent No.: US 7,528,731 B2
(45) Date of Patent: May 5, 2009

(54) SYSTEM AND METHOD FOR MITIGATING DRIVE DISTRACTION AND/OR DROWSINESS BY ILLUMINATED WINDSHIELD WIPER

(75) Inventors: Harry Zhang, Carmel, IN (US); Gregory K. Scharenbroch, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 137 days.

(21) Appl. No.: 11/158,388

(22) Filed: Jun. 22, 2005

(65) Prior Publication Data

US 2006/0290520 A1 Dec. 28, 2006

(51) Int. Cl.
*G08B 23/00* (2006.01)

(52) U.S. Cl. ...................... 340/575; 340/576
(58) Field of Classification Search ............... 340/575, 340/576; 15/250.13
See application file for complete search history.

(56) References Cited

U.S. PATENT DOCUMENTS

| | | | |
|---|---|---|---|
| 5,684,455 A | 11/1997 | Williams et al. | |
| 5,786,765 A * | 7/1998 | Kumakura et al. | 340/576 |
| 5,990,795 A * | 11/1999 | Miller | 340/576 |
| 6,014,601 A | 1/2000 | Gustafson | |
| 6,020,704 A * | 2/2000 | Buschur | 318/483 |
| 6,305,618 B1 * | 10/2001 | Lin | 239/284.1 |
| 6,353,961 B1 * | 3/2002 | Lin | 15/250.001 |
| 6,683,292 B1 | 1/2004 | Charng | |
| 6,864,655 B2 | 3/2005 | Schmitt et al. | |
| 7,137,723 B2 * | 11/2006 | Hwan | 362/503 |
| 2003/0201895 A1 | 10/2003 | Harter, Jr. et al. | |
| 2004/0080402 A1 * | 4/2004 | Lee | 340/425.5 |
| 2004/0090334 A1 * | 5/2004 | Zhang et al. | 340/575 |

FOREIGN PATENT DOCUMENTS

EP  0 443 826  8/1991

OTHER PUBLICATIONS

European Search Report dated Apr. 19, 2007.

* cited by examiner

*Primary Examiner*—Benjamin C Lee
*Assistant Examiner*—Hoi C Lau
(74) *Attorney, Agent, or Firm*—Douglas D. Fekete

(57) ABSTRACT

A system for mitigating driver distraction and/or drowsiness for a vehicle having a steering wheel and windshield comprises an arm that is adapted for attachment to the vehicle so that the arm is juxtaposed an exterior surface of the windshield and so that it sweeps a portion of the exterior surface of the windshield in front of the steering wheel to provide a motion signal. The system includes a driver distraction and/or drowsiness monitor and a control device responsive to the driver monitor, for operating the arm. The arm preferably is part of a windshield wiper assembly and preferably includes a visual signal and/or an auditory signal. A method for refocusing the attention of a distracted driver uses elements of the system.

9 Claims, 2 Drawing Sheets

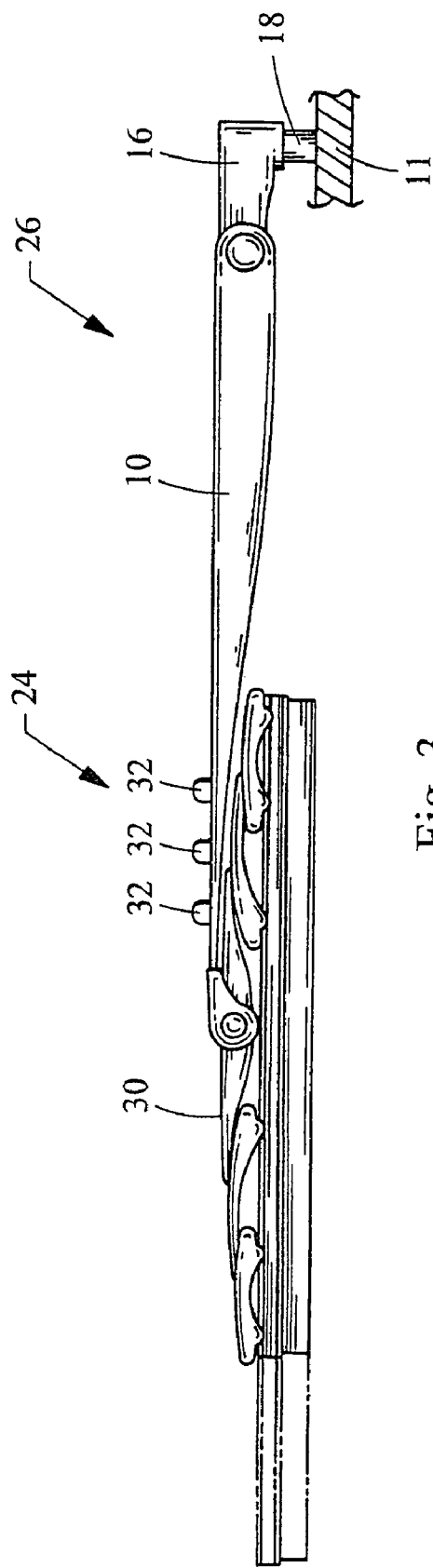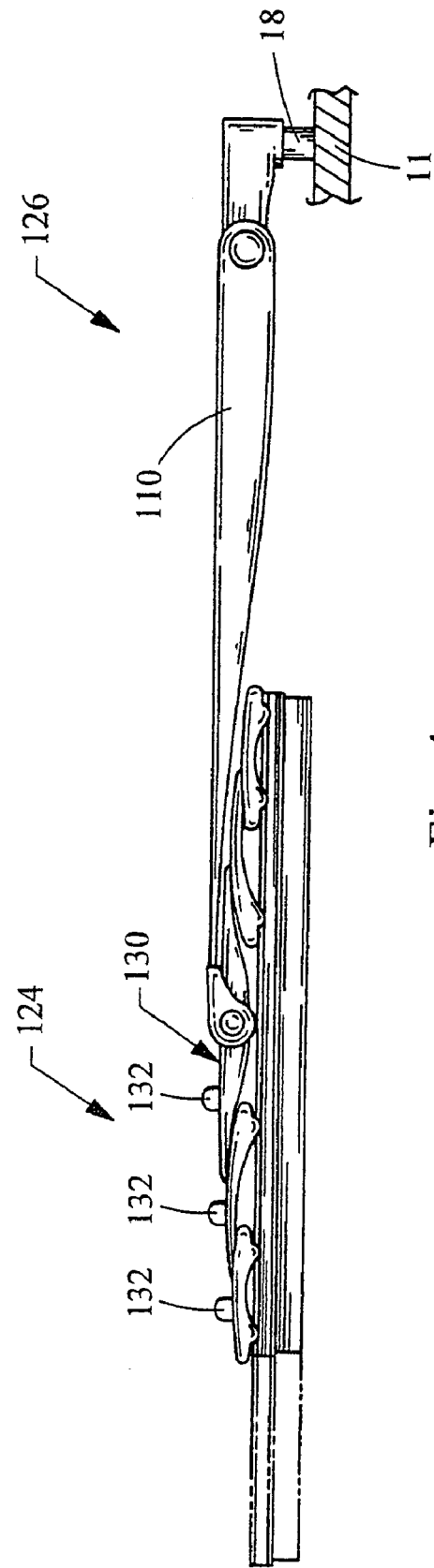
Fig. 3
Fig. 4

SYSTEM AND METHOD FOR MITIGATING DRIVE DISTRACTION AND/OR DROWSINESS BY ILLUMINATED WINDSHIELD WIPER

FIELD OF THE INVENTION

This invention relates to a system for mitigating driver distraction and/or drowsiness.

BACKGROUND OF THE INVENTION

The National Highway Traffic Safety Administration (NHTSA) estimates that approximately 25% of the 6.4 million annual highway crashes, that is about 1.6 million annual highway crashes, are caused by driver distraction. NHTSA is sponsoring programs to reduce driver distraction related highway crashes. These programs involve developing monitors to determine when a driver is distracted. Once a determination has been made that the driver is distracted, it is then necessary to counter the distraction and refocus the driver's attention to driving the vehicle.

SUMMARY OF THE INVENTION

A system for mitigating driver distraction and/or drowsiness for a vehicle having a steering wheel and a windshield comprises an arm adapted for attachment to the vehicle so that the arm is juxtaposed an exterior surface of the windshield and so that the arm sweeps a portion of the exterior surface of the windshield in front of the steering wheel to provide a motion signal. The system includes a driver distraction and/or drowsiness monitor, and a control device responsive to the driver monitor, for operating the arm.

The system for mitigating driver distraction and/or drowsiness also preferably includes a visual signal on the arm, that preferably is intermittent, such as a flashing or flickering light, to accentuate the visual signal; the visual signal being visible from behind the steering wheel when the arm is attached to the vehicle to provide a visual signal to supplement the motion signal.

The arm is preferably a wiper arm that contacts the windshield so as to produce an auditory signal to supplement the motion signal and/or the visual signal of the arm.

The wiper arm may be part of a windshield wiper assembly wherein the visual signal is attached to a free end of an arm of the windshield wiper assembly or attached to a wiper blade sub-assembly of the windshield wiper assembly.

The visual signal is preferably provided by simultaneously or sequentially, intermittently energized LEDs which are highly visible and economical and yet compact and light weight to avoid or at least reduce any adverse effect on the wiping arm or the wiping operation of a windshield wiper assembly when the wiping arm is part of a windshield wiper assembly.

BRIEF DESCRIPTION OF THE DRAWINGS

FIG. 3 is a perspective view of a component of the system for mitigating driver distraction and/or drowsiness that is shown in FIG. 1; and FIG. 4 is a perspective view of an alternate component of the system for mitigating driver distraction and/or drowsiness.

DETAILED DESCRIPTION OF PREFERRED EMBODIMENTS

Figure 1:
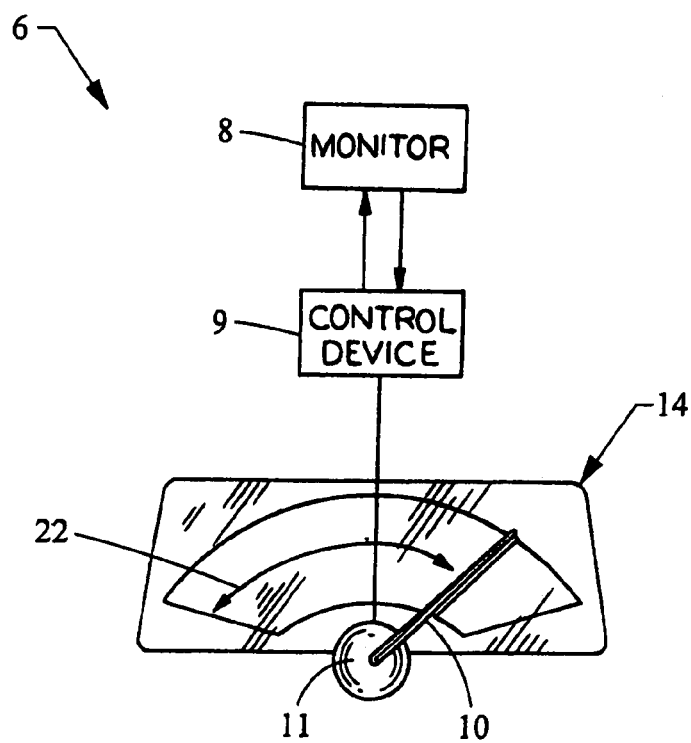
FIG. 1 is a schematic view of a system for mitigating driver distraction and/or drowsiness of the invention.
Figure 2:
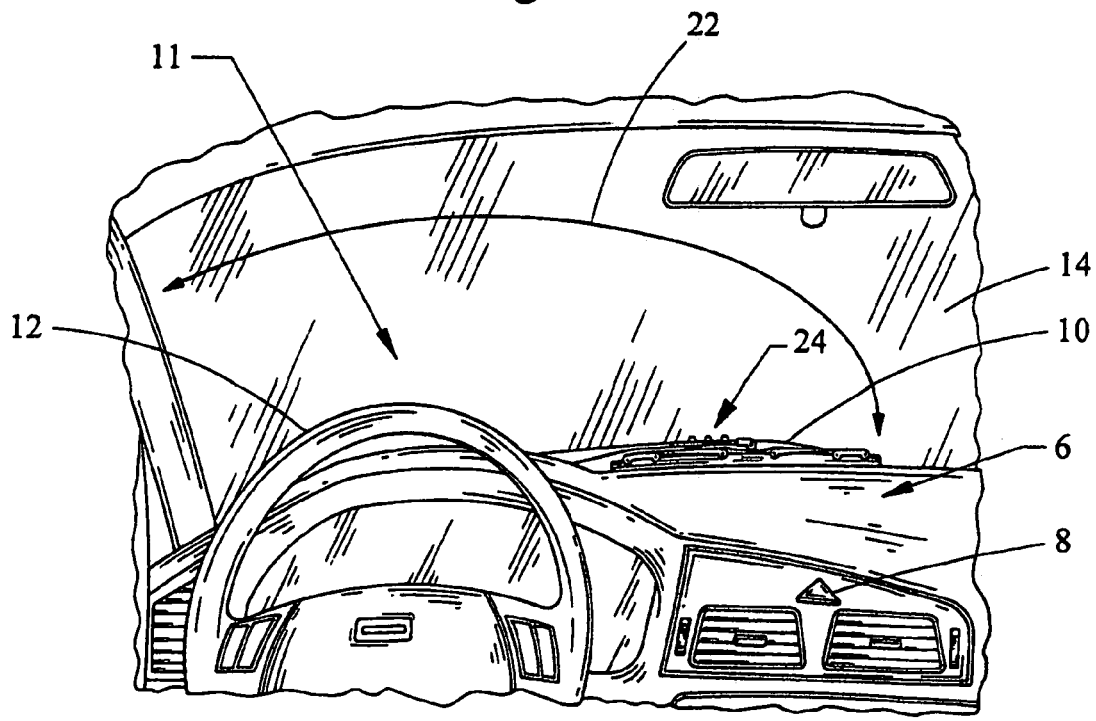
FIG. 2 is a partial view of a vehicle equipped with a system for mitigating driver distraction and/or drowsiness of the invention taken from the driver's seat looking forward through the windshield of the vehicle.

Referring now to FIGS. 1 and 2, a system 6 of the invention for mitigating driver distraction and/or drowsiness comprises a driver distraction and/or drowsiness monitor 8 and a control device 9 that is responsive to the driver monitor 8 for controlling an arm 10. Examples of suitable monitors can be found in U.S. Patent Application Publication No. US2003/0201895A1 entitled "Vehicle Instrument Cluster Having Integrated Imaging System", published Oct. 30, 2003; U.S. Patent Application Publication No. US2004/10090334A1 entitled "Drowsiness Detection System and Method" published May 13, 2004, and U.S. patent application Ser. No. 11/082,608 entitled "System and Method to Determine Visual Awareness" filed Mar. 17, 2005, (Attorney Docket No. DP-311370).

Arm 10 is adapted for attachment to a vehicle 11 having a steering wheel 12 and a windshield 14 so that arm 10 is juxtaposed an exterior surface of the windshield and so that arm 10 sweeps a portion of the exterior surface of windshield 14 in front of the steering wheel 12 to produce a motion signal for the driver seated behind the steering wheel.

Arm 10 includes a socket 16 at one end for attaching the arm 10 to a rotatable post 18 of the vehicle 11 as shown in FIG. 3. When attached, arm 10 is juxtaposed an exterior surface of the windshield 14 and sweeps a portion of the exterior surface of the windshield 14 when the post is oscillated as indicated at 22 in FIGS. 1 and 2. Arm 10 is preferably a wiper arm that contacts windshield 14 to produce an audible signal that compliments the motion signal when arm 10 sweeps the exterior portion 22 of windshield 14.

Arm 10 also preferably has a visual signal 24 that is visible through windshield 14 by the driver of the vehicle seated behind the steering wheel 12 as shown in FIG. 3.

For economy, the arm 10 is preferably an integral part of a conventional windshield wiper assembly 26 comprising arm 10 and a wiper blade sub-assembly 30 as shown in FIG. 3 or a separate part that is attached to the windshield wiper assembly 26. In either event, the visual signal 24 is placed as close as possible to the free end of arm 10 without the possibility of being blocked by wiper blade-assembly 30. This maximizes the travel of the visual signal 24 and thus the effectiveness of the visual signal. The visual signal 24 preferably emits light and placement on arm 10 has the advantage of connecting the light source to an electrical power source easily. The visual signal 24 is more preferably a series of lights and still more preferably a series of light emitting diodes (LEDs) 32 that are highly visible and light weight so as to avoid interference with conventional operation of the windshield wiper assembly 26. It is also preferable that the lights operate intermittently, that is, flash or flicker when energized to enhance the effectiveness of the light signal.

FIG. 4 shows another windshield wiper assembly 126 that can be used as a part of the system 6 of the invention for mitigating driver distraction and/or drowsiness. In this case, the visual signal 124, preferably comprising a plurality of LEDs 132 are part of the wiper blade sub-assembly 130 that is pivotally attached to the free end of the arm 110. While this placement enhances visibility of the visual signal, connecting the light source of the visual signal 124 to an electrical power source could be more difficult.

The system 6 of the invention for mitigating driver distraction and/or drowsiness preferably presents visual signal lights to distracted drivers in combination with the motion signal to re-orient their attention to the forward scene and the driving task. For the visual signal lights, a small number of LEDs 32, for example, two or three yellow or amber LEDs may be attached to the inner or top side of the metal portion of the windshield wiper arm 10. When driver distraction is detected, these LEDs may be turned on and off, in succession and simultaneously to create the effect of flickering or flashing near the forward road area. It has been demonstrated in the psychological literature that people automatically look in the direction of moving objects or in the direction of flashing or flickering lights. Consequently, the flashing or flickering, LEDs mounted on the moving wiper arm quickly re-orient drivers' attention back to the forward road and the driving task.

The windshield wiper assembly 26 or 126 may be turned on for a short period, for example one cycle, when a high level of distraction is detected. The windshield wiper operation provides an additional signal. The movement of the wiper blade as it sweeps the windshield produces an auditory signal as well as a motion signal—the mild sound produced by wiper blade as it brushes across the windshield. Thus the system of the invention can provide three distinct signals to a distracted driver and re-direct the driver's attention to the forward road and the driving task. The wiper motion also produces movement of the LEDs that are attached to the wiper, resulting in moving lights that enhance the effectiveness of the system 6 of the invention.

The preferred system has several advantages. First, it is inexpensive and easy to implement the interface with the driver since the only additional cost of the interface is a few LEDs and electrical wire connecting the LEDs and windshield wiper actuator to the driver distraction and/or drowsiness monitor and the monitor responsive control for the LEDs and the windshield wiper motor. Second, the interface can be very effective. The flashing or flickering LEDs, wiper movement, and wiper sound captures the attention of distracted drivers to re-orient their attention to the forward area and the driving task very quickly and very effectively. Third, the interface can be very well accepted by drivers. The small flickering or flashing LEDs, the wiper movement and wiper sound are mild rather than annoying. The flashing or flickering LEDs and wiper movement are activated only when the driver is distracted so that the interface itself does not create a distraction.

We claim:

1. A system for mitigating driver distraction and/or drowsiness for a vehicle having steering wheel and a windshield, the system comprising:
    a wiper arm attached to the vehicle and adapted to sweep a portion of an exterior surface of the windshield in front of the steering wheel;
    means for operating the wiper arm to sweep the exterior surface of the windshield;
    one or more electrically activated light emitting devices attached to the wiper arm and visible to a driver seated behind the steering wheel for providing a visual signal when activated that is visible to the driver seated behind the steering wheel to capture the driver's attention;
    a control device for actuating said means to operate the wiper and for activating the light emitting devices; and
    a driver distraction and/or drowsiness monitor for detecting a distracted or drowsy condition of a driver and providing a signal in response to detection of a distracted or drowsy condition of said driver to activate said control device to cause said control device to actuate said means for operating the wiper arm and to activate said light emitting devices for providing said visual signal.

2. The system for mitigating driver distraction and/or drowsiness of claim 1 wherein the wiper arm contacts the windshield so as to produce an auditory signal to supplement the motion signal of the arm and the visual signal of said light emitting devices.

3. The system for mitigating driver distraction and/or drowsiness of claim 2 wherein the wiper arm is part of a windshield wiper assembly.

4. The system for mitigating driver distraction and/or drowsiness of claim 3 wherein said light emitting devices are LEDs.

5. The system for mitigating driver distraction and/or drowsiness of claim 4 wherein the LEDs are attached near a free end of the arm of the windshield wiper assembly.

6. The system for mitigating driver distraction and/or drowsiness of claim 4 wherein the LEDs are attached to a wiper blade sub-assembly of the windshield wiper assembly.

7. A method for mitigating distraction and/or drowsiness of a driver of a vehicle, said vehicle comprising a windshield and a steering wheel, said method comprising:
    providing a wiper arm operable by a control device to sweep a portion of an exterior surface of the windshield in front of the steering wheel;
    providing one or more electrically operated light emitting devices attached to the wiper arm so as to be visible to a driver seated behing the steering wheel and operable by the control device, said light emitting devices being effective when operated to provide a visual signal that is visible to the driver seated behind the steering wheel to capture the driver's attention;
    monitoring the driver to detect a distracted or drowsy condition, said monitoring being pefformed by a driver distraction and/or drowsiness monitor producing a signal in response to detection of a distracted or drowsy condition of said driver; and
    supplying said signal to said control device to cause said control device to actuate said wiper and to operate said light emitting devices in response to said signal.

8. The method of claim 7 wherein said light emitting devices are operated intermittenly.

9. The method of claim 8 wherein said light emitting devices are LEDs.

* * * * *